United States Patent [19]

Dalstein et al.

[11] 4,332,241

[45] Jun. 1, 1982

[54] SOLAR ENERGY COLLECTOR PANEL

[75] Inventors: Rolf Dalstein; Johann Spies; Hans-Dieter Greif, all of Stuhr; Günter Termath; Jürgen Unbescheid, both of Gelsenkirchen-Buer; Hans-Werner Nowoczyn, Aachen, all of Fed. Rep. of Germany

[73] Assignee: Erno Raumfahrttechnik GmbH, Bremen, Fed. Rep. of Germany

[21] Appl. No.: 218,550

[22] Filed: Dec. 22, 1980

[30] Foreign Application Priority Data

Dec. 20, 1979 [DE] Fed. Rep. of Germany ....... 2951362

[51] Int. Cl.$^3$ .............................................. F24J 3/02
[52] U.S. Cl. .................................... 126/450; 126/418
[58] Field of Search ............... 126/450, 447, 443, 442, 126/418

[56] References Cited

U.S. PATENT DOCUMENTS 3,961,619 6/1976 Estes et al. ........................ 126/444
4,090,497 5/1978 Kelly ................................. 126/435

FOREIGN PATENT DOCUMENTS 2639354 2/1978 Fed. Rep. of Germany ...... 126/443
2712153 9/1978 Fed. Rep. of Germany ...... 126/446
2357832 10/1978 France ................................ 126/443

Primary Examiner—Albert W. Davis
Assistant Examiner—G. Anderson
Attorney, Agent, or Firm—Ralf H. Siegemund

[57] ABSTRACT

The panel includes two thermally prestressed silicate glass plates with metalized edges to which are solder-sealed lead bars which, in turn, are solder-sealed to a tubular frame. An outer protection frame covers the plate edges. Spacer posts and elements support the plates against pressure upon evacuation. The absorber proper is centrally disposed in the evacuated chamber.

14 Claims, 1 Drawing Figure

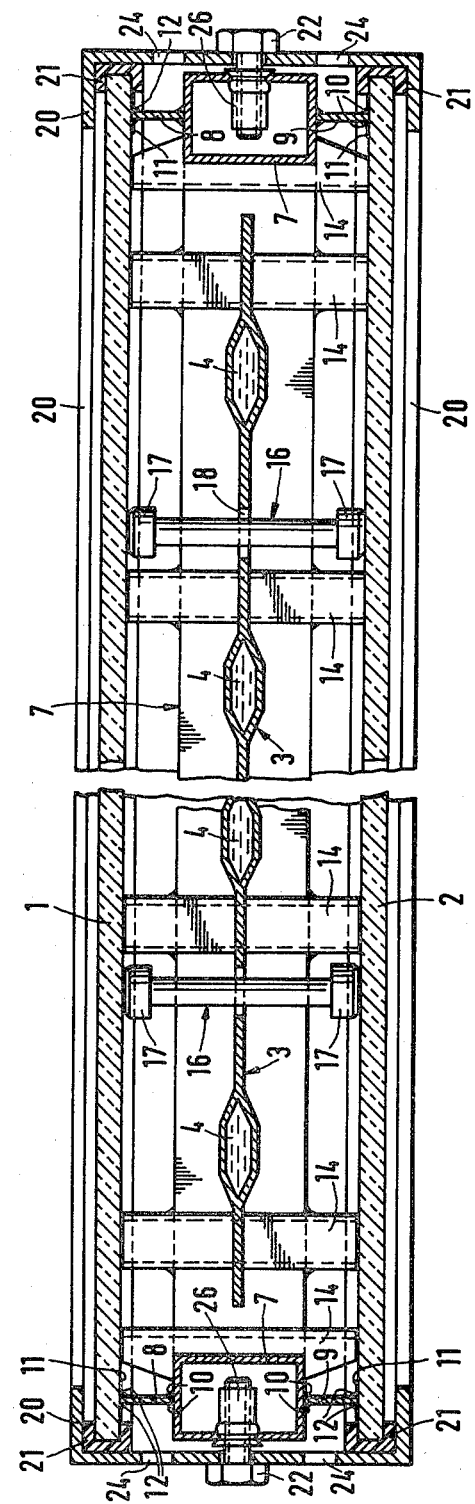

SOLAR ENERGY COLLECTOR PANEL

BACKGROUND OF THE INVENTION

The present invention relates to a solar energy collector constructed as a plate- or panel-like housing.

German petty Pat. No. 77 15 441 discloses a solar energy collector panel using silicate glass plates held together by a spacer frame made of sheet metal aluminum, overlapping on the inside, without being interconnected. This aluminum spacer is bonded to the glass plate by means of a temperature-resisting adhesive, being placed in the corners between the plates and the slightly recessed spacer.

This type of construction is quite stable as to its shape, even when the temperature varies over a large range. This is due to the symmetry of the construction, including particularly the use of similar top and bottom plates. However, the adhesive bonding is deemed insufficient if one wants to evacuate the interior. This known panel is not evacuated; but evacuation of a solar energy panel is desirable because its efficiency will be greatly increased; heat losses due to convection are reduced. The known panel is filled with a gas of low, overall thermal transmission.

DESCRIPTION OF THE INVENTION

It is an object of the present invention to provide a new and improved durable solar collector panel which has an adequate shape stability and can be sealed and evacuated.

In accordance with the preferred embodiment of the invention, it is suggested to provide two prestressed silicate glass plates being metalized along their edges and interconnected by means of a spacer construction which includes a warp-free portion, preferably welded-together tubes of a rectangular cross section, to which easily deformable metal bars are soldered, preferably lead bars which are soldered and sealed to metalized portions of the glass plates. All joints must be sealed, at least from the inside of the space enclosed by the plates and the frame. This interior space contains the absorber proper and the ducts for the heat-exchange medium. Additional spacers should be provided in order to take up the pressure on the glass plates. These spacers may include spacer elements, affixed to the frame, as well as posts or pins with rounded heads in the interior. The frame may be enclosed by an outer frame, primarily for protecting the edges of the glass plates.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawing, in which:

the FIGURE is a cross section through an example, in accordance with the preferred embodiment of the invention for practicing the best mode thereof.

The solar collector as shown in the FIGURE includes an upper, transparent plate 1 and a lower, likewise transparent plate 2. These plates are made of thermally prestressed silicate glass and have a thickness of 6 mm. They are of a rectangular shape with a dimension of 50 cm by 150 cm. Plates 1 and 2 are interconnected by means of a metallic spacer frame and sealed thereto in a vacuum-tight manner to be explained in detail below. The interior of the resulting flat case is evacuated, and the absorber proper is disposed therein.

The radiation-absorbing structure includes a plate 3 having channels 4 which are being flown through by a liquid heat exchange medium. This assembly 3,4 is disposed centrally between plates 1 and 2, i.e., in a plane of symmetry thereof. The channels 4 are connected to suitable connecting pipes, tubes, or nipples (not shown) traversing the frame. The feed-through connection for these tubes, and so forth, requires vacuum-sealing by means of soldering, welding, or the like.

The panel device is shown to be of a complete, structural, and "optical" symmetry. However, in some cases the lower glass plate may be covered by a reflecting layer that directs radiation tending to leave the chamber, back toward the absorber. It is presumed in that case that solar radiation enters the chamber through plate 1, or a reflecting foil may be disposed between plates 3 and 2. Details of the solar energy absorption process are not of immediate significance for the invention, except that the chamber space around plate 3 is evacuated.

The utilization of prestressed glass plates enhances the bending stiffness of the collector panel as a whole as well as its stability under a wide range of temperatures. Further contributing features along that line relate to the frame, spacing, and support structure for these glass plates 1 and 2.

The spacer frame is constructed from tubing 7 of a rectangular cross section, being preferably made from tin-plated iron. Tubing 7 has a dimension of 15 mm by 25 mm at a wall tickness of 1.5 mm. The tubing consists of four sections, each one having bevelled ends, e.g., they are cut at a 45° angle, to be joined to a rectangular frame and welded. Each tube carries an upper, flat bar 8 and a lower, flat bar 9. These bars are amenable to yielding and are, for example, made from a lead strip. The bars are soldered to the tubing 7. They may have a thickness of 1 mm and are about 1 cm high. A range of a 0.5 mm to 2 mm thickness and a height of 5 mm to 15 mm is envisioned here. The frame weld must be vacuum-tight, at least on the inside, up to the flat bars. The solder seams 10 are also vacuum-tight, and adjoining bars on different tube sections are likewise vacuum-tightly interconnected. The soldering of the lead bars 8 and 9 to the glass plates can be carried out as shown, e.g., in German Pat. Nos. 902,085 and 12 04 370 corresponding respectively to U.S. Pat. Nos. 2,235,681 and 2,938,494.

Instead of individual bars, the two strips may run in just two pieces around the entire frame, one above and one below so that only one solder joint per strip is needed.

The glass plates 1 and 2 are copper-plated around and near their edges by means of a metal spray process, at least on those sides facing each other, and that copper-plated surface is subsequently tin-plated. Accordingly, each glass plate carries a rather firmly adhering, two-metal layer 11 along and adjacent to its inwardly directed edges. The bars 8 and 9 are soldered to these metal layers 11; the soldering seams 12 are also vacuum tight.

Thus, there is a (weld) seal between the frame's sections 7 themselves, a solder seal between frame sections 7 and bars 8 and 9, and a solder seal between these bars and the metalized glass. The interior chamber of the panel is, therefore, completely sealed.

A plurality of supplemental, metallic support elements 14 is provided, being arranged around the frame's sections on the inside thereof, and at a spacing of about 10 mm to 15 mm from each other. Side elevations of these elements can be seen near the left and the right ends of the FIGURE; the elements are rectangles in front elevation. They are soldered to the frame and have (vertical) length dimensions equal to the spacing distance between plates 1 and 2. These support elements 14 take up the compression force acting upon plates 1 and 2 upon evacuation of the chamber between them. Thus, this compression force does not have to be taken up by the yielding bars 8 and 9.

The resulting assembly is mechanically very stabile, and resists warping, but is sufficiently elastic, particularly in the sealed areas. Thermal gradients are flattened and excessive local temperature differentials are avoided. The interior remains sealed, even at very low pressure. Spacers are provided, posts or pins 16, which are arranged at a distance of about 5 cm to 15 cm. They are more or less regularly distributed in the interior of the chamber between the glass plates in order to support them throughout. The pins have heads 17 on both ends, being of a larger diameter and of a convexly bulging contour; i.e., they are shaped as spherical calottas at a large radius. This feature permits a slight tilt between a post and the respective adjacent glass plate without incurring local pressure points. The pins and heads, or the heads alone, are made of a ductile, i.e., plastically deformable material such as copper, and their sufaces are nickle- or chrome-plated. Alternatively, the posts 16 may be made of glass in order to avoid shading of any portion of the absorber plate 3. This plate has apertures, being traversed by the posts.

Reference numeral 20 refers to an outer frame disposed around the outer edges of plates 1 and 2 for purposes of protection. This frame has a U-shaped cross section, the "U" lying sideways and being oriented inwardly, as far as the chamber is concerned. Soft, plastic, profiled stripping 21 is interposed between the metal of frame 20 and the glass of the plates. Screws 22 fasten the frame 20 to the frame 7. The screws are inserted in blind-rivet-type nuts 26. This type of nut is pushed into an opening of tubular member 7 from the same side from which the respective nut will be inserted. As the screw is threaded into the nut, the latter spreads and bulges to be, thereby, firmly seated in the respective part 7; the screw, in turn, is now being fastened to the anchored nut.

It should be noted that the outer wall of a frame part or section 7 can be provided with such an opening on account of its tubular configuration. The integrity of the chamber's vacuum is not effected thereby. The outer frame 20 is additionally provided with venting openings 24 for the space between frame 7, and so forth, and frame 20.

The invention is not limited to the embodiments described above; but all changes and modifications thereof, not constituting departures from the spirit and scope of the invention, are intended to be included.

We claim:

1. A solar energy collector panel, comprising:
   a first and second prestressed silicate glass plate;
   a spacing frame for supporting the glass plates in spaced-apart relationship, the spacing frame including
   (i) a warp-resisting frame portion;
   (ii) yielding and deformable, upstanding metal bars soldered to said frame portion and to metalized portions of the glass plates, for sealing an interior space as defined by and between said glass plates and said frame;
   and
   an absorption means disposed in said space.

2. A panel as in claim 1, including spacer posts in said space.

3. A panel as in claim 1 or 2, including spacer support means affixed to said frame and bearing against said glass plates.

4. A panel as in claim 3, the spacer support means being a plurality of spaced-apart spacers.

5. A panel as in claim 2, said posts made of glass or a ductile metal.

6. A panel as in claim 2 or 5, said posts having rounded heads at both ends bearing against said plate.

7. A panel as in claim 1, the warp-resisting frame portion being made of tubing.

8. A panel as in claim 7, the tubing having a rectangular cross section.

9. A panel as in claim 7 or 8, the tubing being plurally welded together sections.

10. A panel as in claim 7, and including a protective outer frame extending along edges of said glass plates, there being protective means interposed.

11. A panel as in claim 10, the outer frame being screw-fastened to said tubing.

12. A panel as in claim 10, the outer frame having venting openings.

13. A panel as in claim 1, including additional, spaced-apart spacer elements.

14. A panel as in claim 13, said spacer elements being spaced apart by a distance of between 5 cm to 15 cm, said bars being made of lead and having a thickness of from 0.2 mm to 2 mm and a width of from 5 mm to 15 mm.

* * * * *